United States Patent [19]

Kitamura et al.

[11] Patent Number: 5,085,018
[45] Date of Patent: Feb. 4, 1992

[54] EXTENDABLE MAST

[75] Inventors: Takayuki Kitamura, Yokosuka; Koichi Yamashiro, Zama, both of Japan

[73] Assignee: Japan Aircraft Mfg., Co., Ltd., Yokohama, Japan

[21] Appl. No.: 577,082

[22] Filed: Aug. 31, 1990

Related U.S. Application Data

[63] Continuation-in-part of Ser. No. 482,206, Feb. 20, 1990, abandoned.

[30] Foreign Application Priority Data

Jul. 19, 1989 [JP] Japan .................................. 1-186780
Feb. 9, 1990 [JP] Japan .................................. 2-28255

[51] Int. Cl.⁵ .............................................. E04H 12/18
[52] U.S. Cl. .......................................... 52/108; 52/646
[58] Field of Search ................. 52/108, 114, 646, 648, 52/645

[56] References Cited

U.S. PATENT DOCUMENTS

| | | |
|---|---|---|
| 4,475,323 | 10/1984 | Swartzberg et al. |
| 4,480,415 | 11/1984 | Truss .............................................. 52/108 |
| 4,557,097 | 12/1985 | Mikulas, Jr. et al. ................. 52/646 |
| 4,578,919 | 4/1986 | Amadon et al. ................... 52/108 X |
| 4,655,022 | 4/1987 | Natori ............................... 52/108 X |
| 4,866,892 | 9/1989 | Satoh et al. ...................... 52/646 X |
| 5,662,130 | 5/1987 | Miura et al. ........................... 52/108 |

OTHER PUBLICATIONS

NASA/MSFC contract NAS8-34677, Oct. 1983, Development of Deployable Structures for Large Space Platform Systems, Executive Summary, vol. I, prepared for NASA, George C. Marshall Space Flight Center, Alabama 35812 (p. 4, lines 34-38; FIGS. 3, 4, 6).

*Primary Examiner*—David A. Scherbel
*Assistant Examiner*—Lan Mai
*Attorney, Agent, or Firm*—Frishauf, Holtz, Goodman & Woodward

[57] ABSTRACT

An extendable mast of the joint type constructed by freely swingably connecting essentially-rigid members to one another. It includes a plurality of battens extending in the traverse direction of the mast, a plurality of longerons extending in the longitudinal direction of the mast to connect battens adjacent in the longitudinal direction of the mask, and diagonals arranged along the diagonal lines of a rectangle which is formed by the two battens adjacent in the longitudinal direction of the mast and by the two longerons adjacent in the traverse direction thereof. Each of the longerons consists of a pair of beam members freely swingably connected to each other and when these beam members are folded, the mast is also folded compact. The diagonal comprises plural slider members slidable relative to each other and it can be extended to a full length. When these diagonals are extended to their full length, the beam members are locked under overcenter condition.

4 Claims, 7 Drawing Sheets

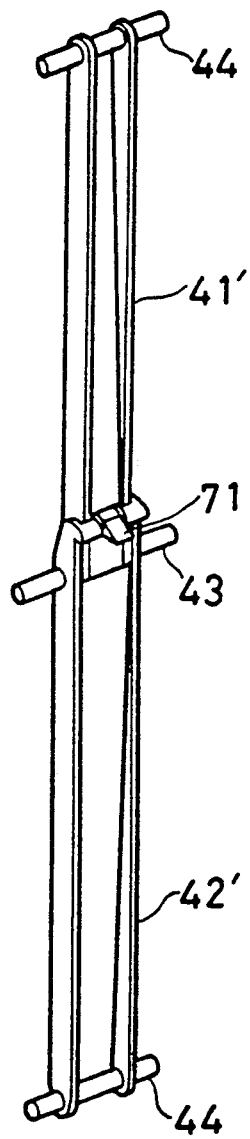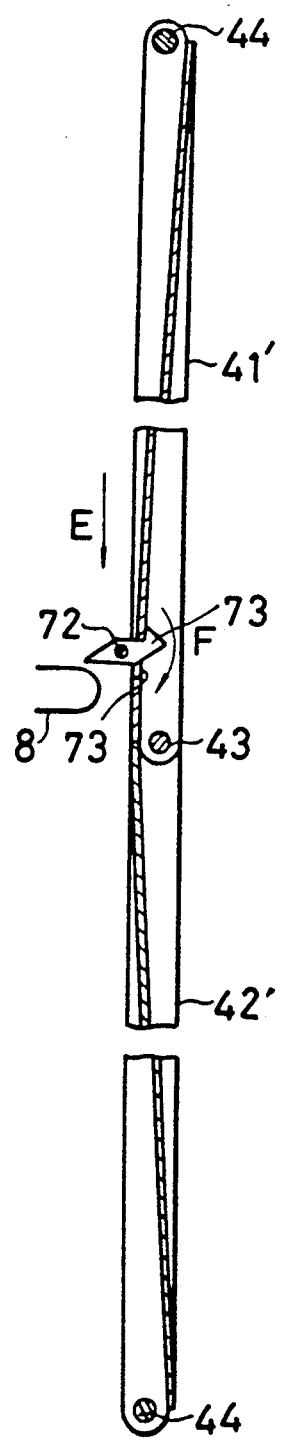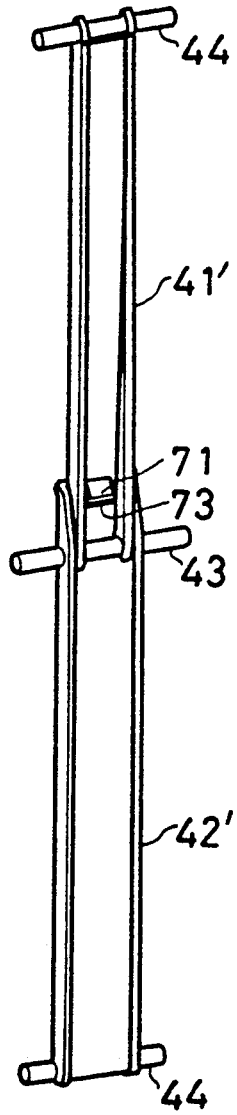
FIG. 12
FIG. 13
FIG. 14

EXTENDABLE MAST

This application is a continuation-in-part of application Ser. No. 07/482,206, filed Feb. 20, 1990, now abandoned.

BACKGROUND OF THE INVENTION

1. Field of the Invention

The present invention relates to an extendable mast which can be deployed and folded. The extendable mast can be used as a component for such structures as space station and craft. It can also be used as a component for the extendable boom and the like.

2. Description of the Related Art

It is planned that the extendable mast is used as a structural member for a space station. This extendable mast which is folded to occupy a space as small as possible is mounted in the rocket or space shuttle and launched into the space. It is deployed in space and used as a structural member for structures such as a space station.

There are various types of the extendable masts and one of them includes a plurality of long rod-like longerons which can be freely bent. The extendable mast of this type is a truss-like structure made by connecting the longerons with a plurality of battens. It is folded by bending the freely-transformable longerons like coils. It is kept folded by a holder system. When it is to be deployed, it is released from the holder system. When it is released from the holder system, it is extended like a line due to the elasticity of the longerons to form a truss structure. The extendable mast of this type is simple in structure. However, its rigidity is low when it is extended.

This drawback is quite troublesome when the extendable mast of this type is used as a structural component for a large-sized space station. When it is used for this purpose, leaving its rigidity low, the natural frequency of the whole space station becomes low, thereby making it difficult for this frequency to be attenuated and controlled.

Another type of extendable mast is a truss-beam-like structure made by freely swingably connecting essentially-rigid members. The extendable mast of this joint type can be folded when these members are swung and folded. It is also extended when the members are deployed like a line. It can have a high rigidity but it becomes complicated in structure and this causes it to have a high weight.

The extendable mast of this joint type is disclosed in NASA (US) contractor Report 172461 (1986) "Batten Augmented Triangular Beam". A plurality of elastically-transformable battens are used in this case to form triangular frames. Two adjacent triangular frames of battens are connected to each other at their apexes by three longerons to thereby form truss-beam-like structure as a whole. Each of the longerons connecting the two adjacent triangular frames of battens consists of a pair of beam members, which are freely swingably connected by a pin. When the paired beam members are swung and folded, the extendable mast is also folded. When the mast is being folded, the battens are elastically transformed or deformed. Diagonals are stretched along diagonal lines of a rectangle which is formed by two battens adjacent in the vertical direction of the mast and by two longerons adjacent in the traverse direction of the mast. When the mast is extended, pull load is added to the diagonals and compression load to the longerons. In the case of this extendable mast, however, its rigidity is insufficient and its strength is low when it is extended, because the battens are elastically transformable.

Various types of extendable masts have been developed, but they could not sufficiently satisfy the purposes, counter to each other, of making them simple in structure, light in weight and high in their folding efficiency, and of making them high in rigidity when they are extended.

SUMMARY OF THE INVENTION

The object of the present invention is to provide an extendable mast of the joint type higher in rigidity but simpler in structure and lighter in weight.

According to a example of the extendable mast of the present invention, a plurality of battens extending in the traverse direction of the mast are connected by a plurality of longerons extending in the longitudinal direction of the mast. Each of the longerons for connecting the battens adjacent in the longitudinal direction of the mast consists of a pair of essentially rigid beam members, which are freely swingably connected to each other in the center of the interval between two frames of battens adjacent in the longitudinal direction of the mast. Diagonals are arranged analog the diagonal lines of a rectangle which is formed by two battens adjacent in the longitudinal direction of the mast and by two longerons adjacent in the traverse direction thereof. Each of the diagonals consists of plural slider members and it is extended, sliding the slider members relative to each other. The extent to which the slider members are slid relative to each other is so limited as not to extend the diagonal longer than a certain length. The extendable mast can be collapsed, swinging and folding the beam members, a pair of which form the longerons. When the mast is collapsed, the diagonals are made shortened. When the beam members are deployed like a line, the mast is extended. As the mast is extended, the diagonals are also extended and then to their full length when the extending of the mast is finished. The diagonals are extended to their full length just before the paired beam members are about to be extended like a line. The paired beam members are deployed like a line, keeping the diagonals elastically extended, and then brought into an overcenter condition. The beam members are kept under this overcenter state by their stoppers.

According to the extendable mast of the present invention, the paired beam members which form each of the longerons are locked under the overcenter conditions and that the diagonals are elastically extended on their full length. Each of the diagonals consists of plural slider members and has a higher pull rigidity, as compared with conventional cords such as the wire rope. This mast is of the joint type and when it is extended, the diagonals which are high in pull rigidity are extended in the form of their being elastically transformed or deformed, while internal load is being added to all of the members for the mast and to their connected portions. Therefore, the whole of the mast has a high rigidity. Further, the paired beam members which form each of the longerons can be locked by themselves under overcenter condition when the mast is extended. This makes it unnecessary to use an addition system for locking the beam members extended. Therefore, the mast can be made simpler in structure and thus lighter in weight.

BRIEF DESCRIPTION OF THE DRAWINGS

FIGS. 1 through 4 illustrate the first embodiment of an extendable mast according to the present invention, of which FIG. 1 is a perspective view, FIG. 2 is a side view, FIG. 3 is a perspective view of a longeron, and FIG. 4 is a longitudinal partly sectioned view of a diagonal;

FIGS. 7 through 11 illustrate the fourth embodiment of the present invention, of which FIG. 7 is a perspective view of a longeron, FIG. 8 is a front view of the longeron, FIG. 9 is a longitudinal sectional view of the longeron, and FIGS. 10 and 11 are longitudinal sectional views showing the operation of a lock mechanism; and FIGS. 12 through 14 illustrate the fifth embodiment of the present invention, of which FIG. 12 is a perspective view of a longeron, FIG. 13 is a longitudinal sectional view of the longeron, and FIG. 14 is a perspective view showing what the longeron looks like if viewed in a different direction from that of FIG. 12.

DETAILED DESCRIPTION OF THE PREFERRED EMBODIMENTS

Figure 1:
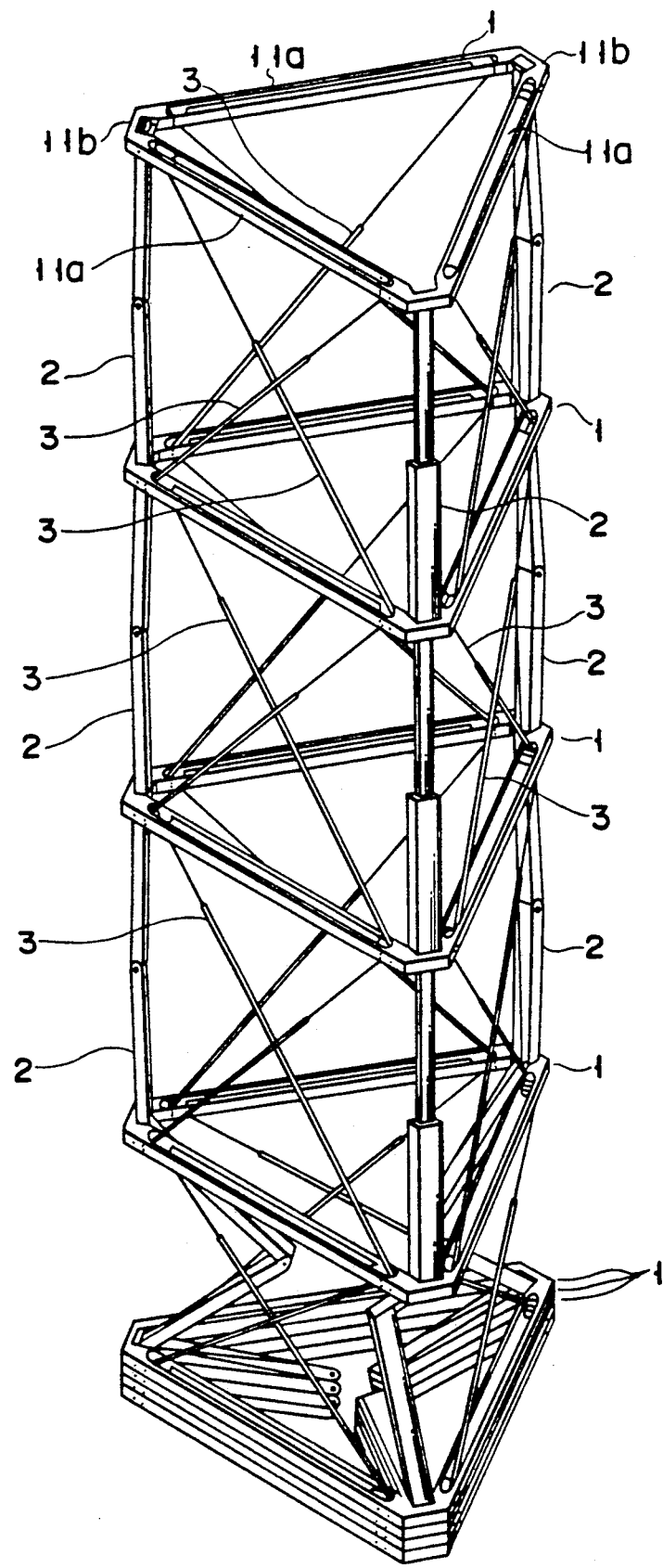
Figure 2:
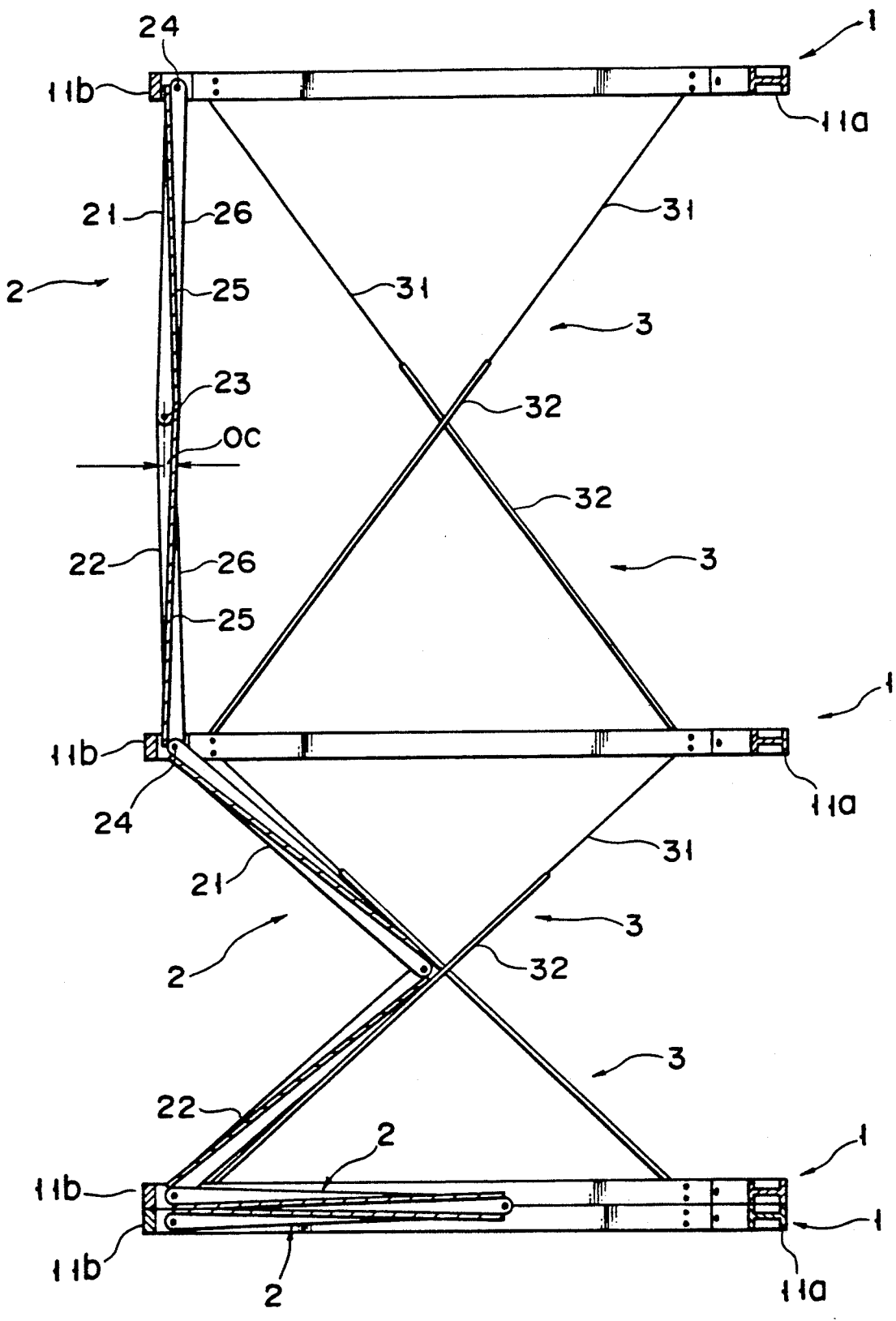

FIGS. 1 through 4 show an example of the extendable mast according to the present invention, in which FIG. 1 shows the upper half of the extendable mast extended and the lower half of it folded and FIG. 2 shows the upper frame of two frames of the mast extended and the lower frame of two frames of it about to be folded.

The extendable mast can be used as a structural member for the space station. It can also be used as a body of the extendable boom for enabling access to be gained from the space station to the space shuttle.

The extendable mast has a plurality of battens 1. Each batten 1 is essentially rigid and has a polygonal shape (e.g., a triangular shape). It is made up of three frame members 11a each of which has an "H"-shape cross section, and three connection members 11b each of which connects ends of two of the frame members 11a together. Frame and connector members 11a and 11b are made of aluminum alloy or fiber reinforced material for example. Batten members 1 extend in the traverse direction of the extendable mast.

The batten 1 is connected at its apexes or connector members 11b to its adjacent batten 1 by longeron members 2. These longerons 2 extend in the longitudinal direction of the extendable mast. Each of these longerons 2 consists of a pair of essentially rigid beam members 21 and 22. These beam members 21 and 22 are made of aluminum alloy or fiber reinforced material. Remote ends of these beam members 21 and 22 are freely swingably attached to connector members 11b of two adjacent batten members 1 and the other ends thereof are freely swingably connected to each other. Beam members 21 and 22 are swung in a plane which includes the center line of the extendable mast.

Diagonal members 3 are stretched along diagonal lines of a rectangle which is formed by two adjacent battens 1 and two adjacent longerons 2. Each of diagonals 3 consists of two slider members 31 and 32 slidable relative to each other. It is therefore freely extendable, and its both ends are freely swingably connected to connector members 11b of adjacent battens 1.

As shown by the lower halves of the extendable mast in FIGS. 1 and 2, the extendable mast is folded compact by swinging beam members 21 and 22, which form longerons 2, inward. Diagonals 3 are shortened in this state. When beam members 21 and 22 are deployed like a line, the mast is extended as shown by the upper halves of it in FIGS. 1 and 2. Diagonal members 3 are extended to their full length it this state.

Figure 3:
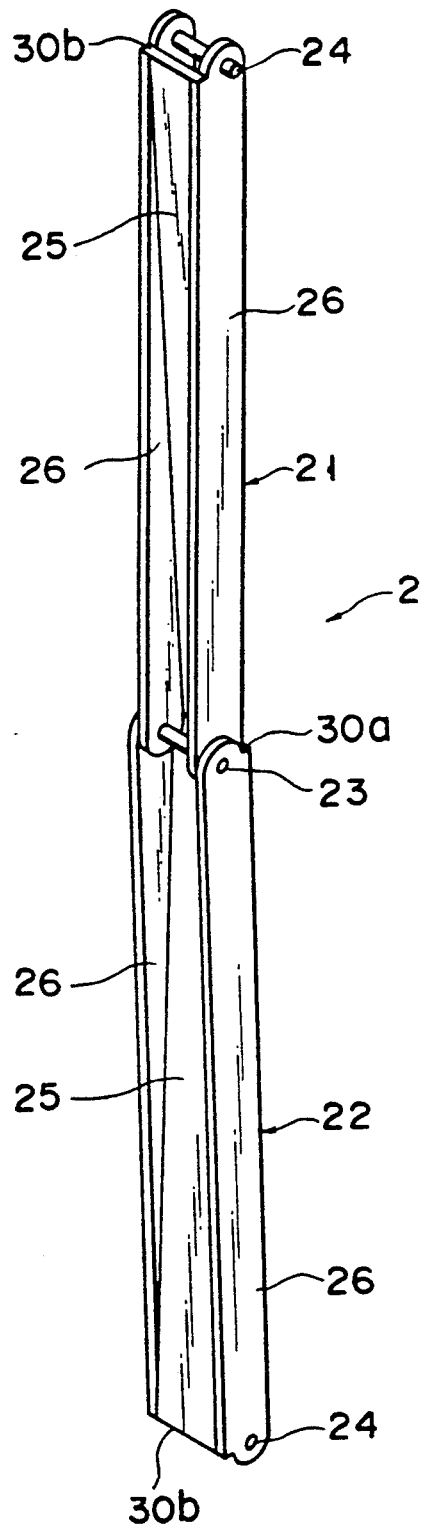

Each of longeron members 2 has such an arrangement as shown in FIG. 3. Each of first and second beam members 21 and 22 which form longerons 2 has a H-shaped section and includes web 25 and flanges 26 formed integral to both sides of web 25. Web 25 has stopper faces 30a and 30b at their both ends. Respective ends of beam members 21 and 22 are freely swingably connected to each other substantially in the center of longerons 2 between two adjacent batten members 1 by pin 23. The other ends thereof are freely swingably attached to connector members 11b of batten members 1. The width of second beam member 22 is made larger by the thickness of flanges 26 than that of first beam member 21. Each of webs 25 is tilted relative to the center line of flanges 26. When these beam members 21 and 22 are folded, therefore, flanges 26 of first beam member 21 are received between flanges 26 of second beam member 22 and the tilted webs 25 do not interfere with each other. This enables first beam member 21 to be nested inside second beam member 22 and the extendable mast to be thus folded with high occupied space efficiency.

When deployed, these beam members 21 and 22 are locked to each other under an overcenter condition so that pin 23 is shifted only by a distance Oc outward of a straight line which extends between two adjacent pins 24, and that stopper faces 3a of beam members 21 and 22 contact with each other and lock these beam member 21 and 22 in such a overcenter condition, as shown in FIG. 2.

Figure 4:
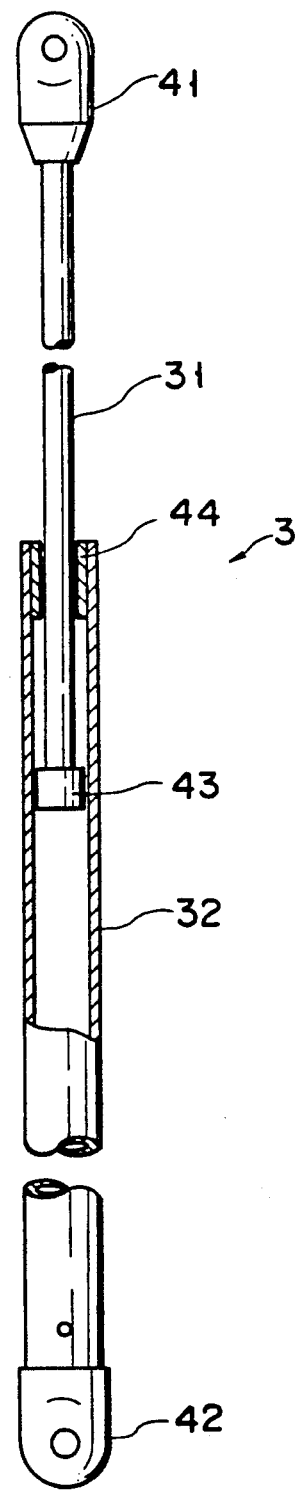

Each of diagonals 3 is arranged as shown in FIG. 4. It comprises cylindrical and rod-like slider members 32 and 31. Rod member 31 is freely slidably inserted into cylindrical member 32. Stopper 43 is attached to the distal end of rod member 31. Stopper 44 is also attached to the inner circumferential face of the distal end of cylindrical member 32. When diagonal 3 is extended to its full length, stopper 43 of rod member 31 is in contact against stopper 44 of cylindrical member 32 to thereby limit the full length of diagonal member 3. Attachments 41 and 42 are attached to rear ends of cylindrical and rod members 32 and 31 and diagonal member 3 is freely swingably attached to connector members 11b of two adjacent triangular frames of batten members 1 by attachments 41 and 42.

When the extendable mast is to be extended, diagonal members 3 are extended to their full length before beam members 21 and 22 of longeron 2 are made straight with pins 23 and 24 aligned on a straight line. Beam members 21 and 22 are further swung and diagonals 3 are further extended, pulling cylindrical and rod members 32 and 31 and elastically deforming them. Beam members 21 and 22 are still further swung outward over the straight line with their stopper faces 30a coming into contact. They are thus locked by the elasticity of diagonal members 3 into the above described overcenter condition. This makes it unnecessary to use an additional lock system for locking longeron member 3 in its extended state. When the extendable mast is extended in this manner, compression load is added to longerons 2 and pull load to diagonals 3. Further load is added to connected portions of these longerons 2 and diagonals 3. Play is thus eliminated from the connected portions of these members, thereby enhancing the rigidity of the extended mast.

The folded extendable mast is mounted in the space shuttle, rocket or the like and launched together with it into the space. It is extended in space and used as a structural member for the space station. It needs a device for extending it in space but this device may be of any type and has nothing to do with the present invention. It is also used as a frame for the boarding bridge which enables access to be gained from the space station to the space shuttle.

Figure 5:
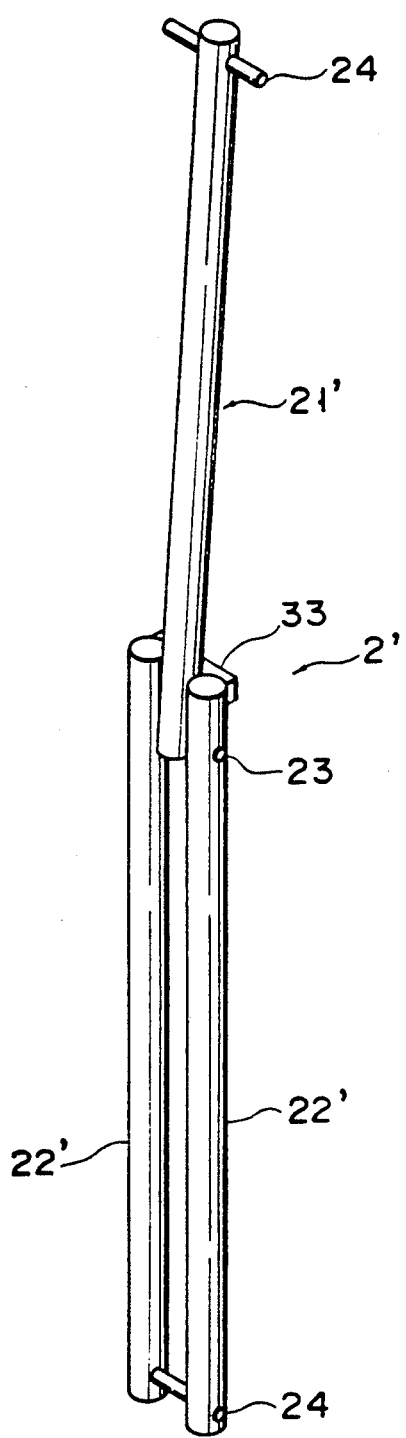
FIG. 5 is a perspective view of a longeron employed in the second embodiment of the present invention.

FIG. 5 shows another example of the longeron. The first beam member is a cylindrical member 21' having a circular section and the second beam member consists of two cylindrical members 22' each having a circular section. Two cylindrical members 22' are arranged parallel to each other with a certain interval interposed between them, and this interval is a little larger than the diameter of first cylindrical member 21'. These cylindrical members 21' and 22' are freely swingably connected to one another by pin 23. They are also freely and swingably attached to connector members 11b adjacent to each other in the longitudinal direction of the mast. Stopper 33 is attached to the front ends of two cylindrical members 22'. When cylindrical members 21' and 22' are folded, first cylindrical member 21' comes into between two cylindrical members 22'. This enables the extendable mast to be folded more compact. When cylindrical members 21' and 22' are extended, they are locked by stopper 33 with overcenter condition.

Figure 6:
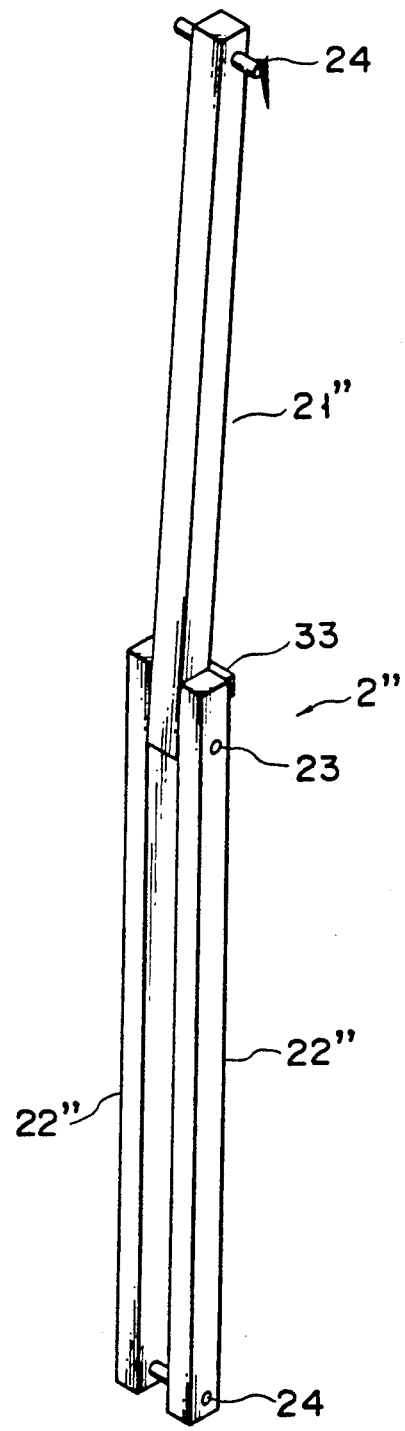
FIG. 6 is a perspective view of a longeron employed in the third embodiment of the present invention.
Figure 8:
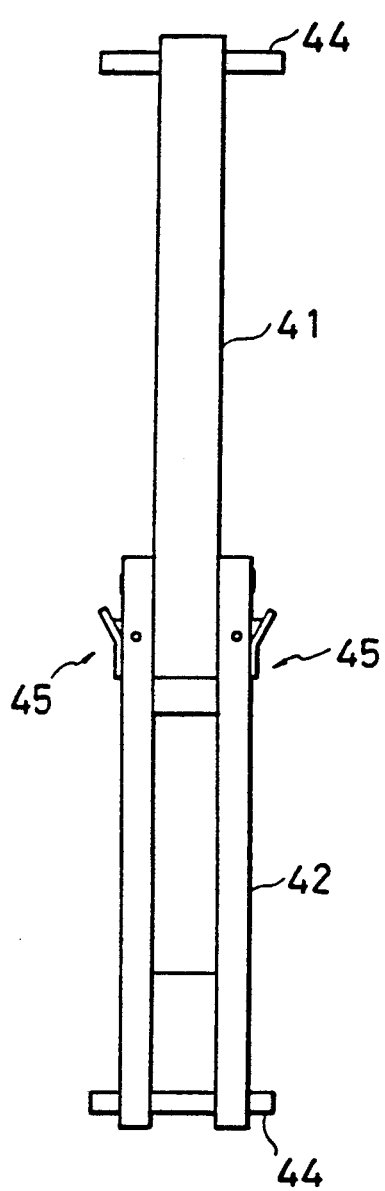
Figure 7:
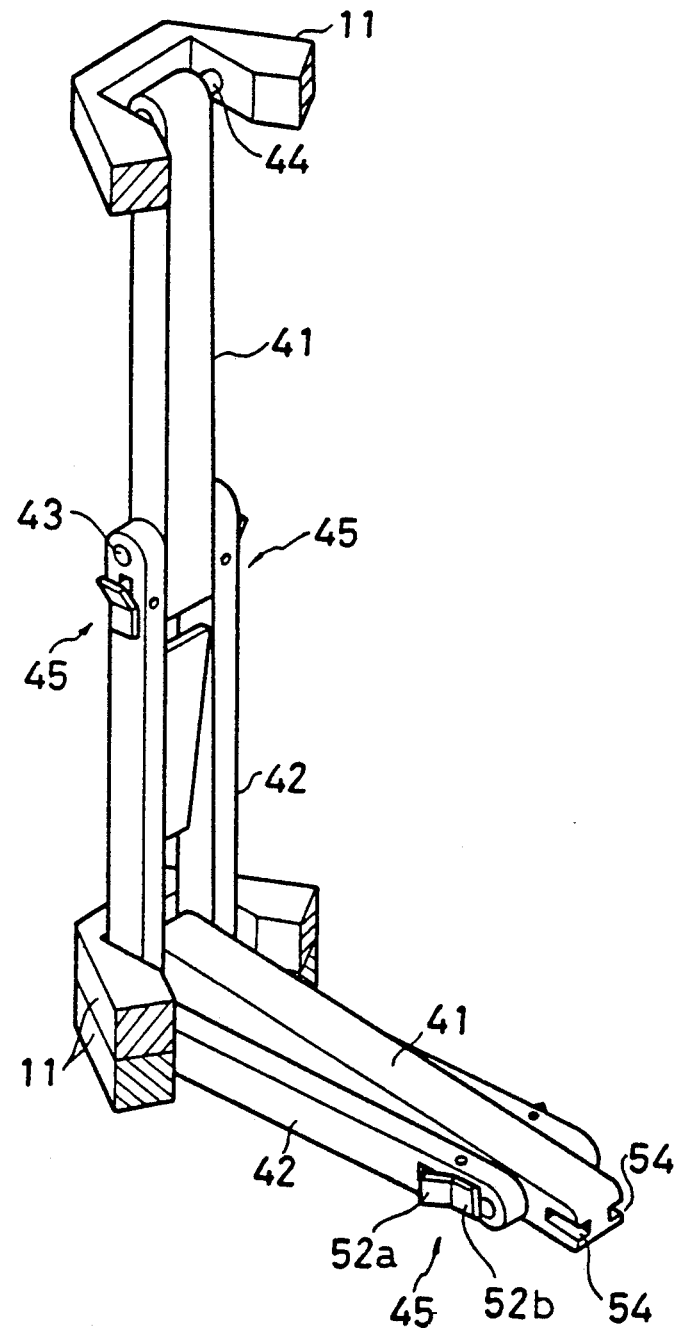
Figure 9:
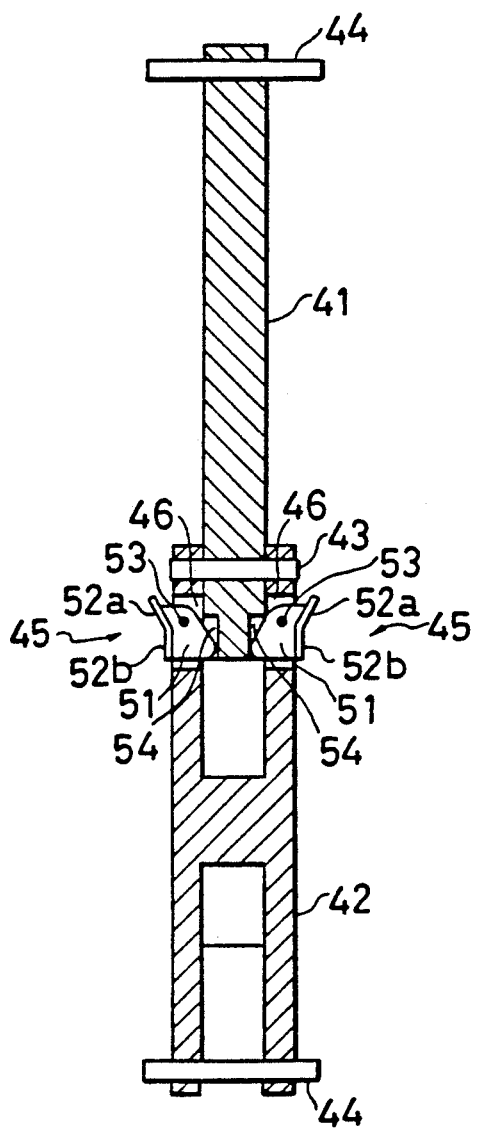

FIG. 6 shows a further example of the longeron. This longeron 2" uses a rectangular pipe 21" as its first beam member and two rectangular pipes 22" as its second beam members. The behavior and function of this longeron are same as those of the above-described ones.

When the extendable mast is small in size, rod members may be used instead of the pipe members.

FIGS. 7 through 11 illustrate the fourth embodiment of the present invention. In this embodiment, a mechanical lock mechanism is provided for the pivotally-coupled portion between the rotatable members of a longeron. The rotatable members are locked in an expanded state by means of the lock mechanism and by utilization of the overcentering of the rotatable members.

Referring to FIGS. 7-11, a first rotatable member 41 and a second rotatable member 42 are pivotally coupled together by means of a pin 43. A lock mechanism 45, which will be described in detail below, is provided for the pivotally-coupled portion between the members 41 and 42.

The upper end of the second rotatable member is divided into two parts, and a slit-like through hole 46 is formed in each part. A plate-like locking member 51 is located within each through hole 46 and is pivotally coupled to the second rotatable member 46 by means of a pin 53. Each locking member 51 has contact portions 52a and 52b. These contact portions 52a and 52b are formed at a predetermined angle with reference to each other and have a substantially V-shaped cross section.

A slit-like locking groove 54 is formed on either side of the lower end of the first rotatable member 41. When the locking members 51 are rotated, they are fitted into the respective locking grooves 54, thereby locking the rotatable members 41 in an expanded state.

Figure 10:
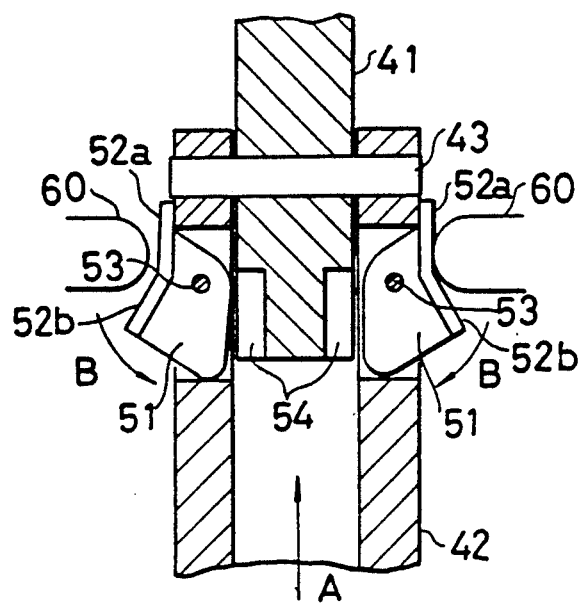
Figure 11:
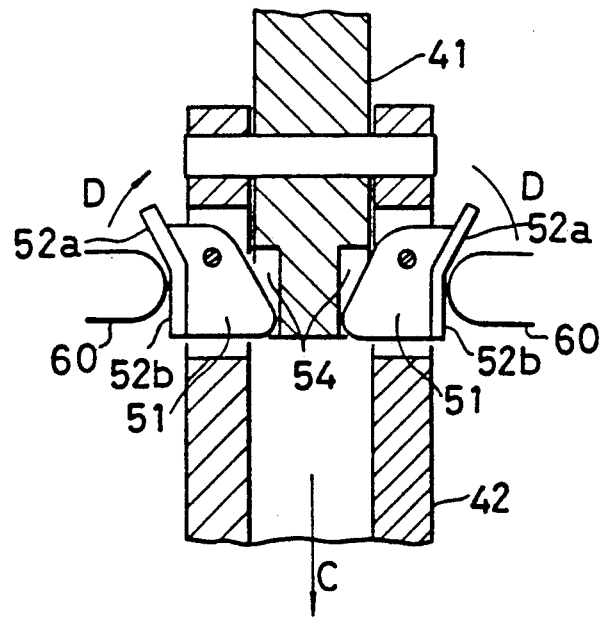

When the extendable mast is in a contracted condition, the locking members 51 are in disengagement from the respective locking grooves 54, as is shown in FIG. 10. In other words, the lock mechanism 45 is in an unlocked state. In this state, the first rotatable member 41 is rotated around the pin 43 and is folded within the second rotatable member 42.

To expand the mast, the rotatable members 41 and 42 are extended linearly and are locked by utilization of the overcentered state. This operation is performed from the distal end of the mast to the proximal end thereof. When the mast is being expanded, the rotatable members 41 and 42 are axially slid, as is indicated by arrow A in FIG. 10. At the time, driving projections 60 of a mast-receiving mechanism (not shown) come into contact with the contact portions 52b of the locking members 51, thus rotating the locking members in the direction indicated by Arrow B. As a result, the locking members 51 are fitted into the respective locking grooves 54, so that the rotatable members 41 and 42 are locked in an extended state.

To contract the mast from its expanded state, the rotatable members are folded, from the proximal end of the mast to the distal end thereof. In this case, the rotatable members 41 and 42 are slid in the direction indicated by arrow C in FIG. 11. Therefore, the driving projections 60 come into contact with the contact portions 52a of the locking members 51. As a result, the locking members 51 are rotated in the direction indicated by arrow D, thus undoing the lock mechanism.

According to the fourth embodiment, the rotatable members 41 and 42 are locked in an expanded state not only by utilization of overcentering but also by means of the lock mechanism 45. Therefore, the rotatable members can be reliably held in a locked state. Even if an external object touches or strikes the mast in the expanded state, the lock mechanism 45 prevents the rotatable members 41 and 42 from being rotated and released from the overcentered state. Accordingly, the mast of the fourth embodiment is very reliable.

FIGS. 12-14 illustrate the fifth embodiment. In this embodiment, a hook-like locking member 71 having a slanted surface is pivotally coupled to the upper end of a second rotatable member 42' by mans of a pin. A rectangular locking hole 73 is formed in the lower end portion of a first rotatable member 71'. With the locking member 71 being engaged with the locking hole 73, the rotatable members 41' and 42' are locked in an expanded state. The locking member 71 is urged in a locking direction by a spring (not shown) located within the support portion of the pin 72.

The mast of the fifth embodiment is expanded by linearly extending the rotatable members 41' and 42'. By so doing, the slanted surface of the locking member 51 abuts the edge of the locking hole 73, so that the locking member 51 is rotated against the urging force of the spring. As a result, the locking member 51 is automatically brought into engagement with the edge of the locking hole 73.

To contract the mast, the rotatable members 41' and 42' in the expanded state are moved in the direction indicated by arrow E in FIG. 13. Since the driving projection 80 of a mast-receiving mechanism abuts the locking member 51, this locking member 51 is rotated in the direction indicated by arrow F, thus undoing the lock of the locking member 51.

What is claimed is:

1. An extendable mast constructed by freely swingably connecting a plurality of essentially rigid members to one another comprising:

a plurality of battens extending transversely of the mast;

a plurality of longerons extending longitudinally of the mast to connect adjacent battens;

diagonals arranged along diagonal lines of a plurality of rectangles arranged between adjacent battens and around the periphery of said mast, with each of said plurality of rectangles being formed by two longerons adjacent to each other transversely of the mast and two of said plurality of battens adjacent to each other longitudinally of the mast, wherein each of said diagonals includes plural slider members which are extended by sliding said plural slider members relative to each other, and a maximum length of such diagonal is defined by means for limiting the extent to which the slider members are slid relative to each other;

each of said plurality of longerons includes a pair of first and second beam members, wherein respective opposed ends of these beam members are freely swingably connected to each other while ends thereof remote from each other are freely swingably connected to adjacent ones of said plurality of battens, wherein the extendable mast is extended when these beam members are deployed and locked under overcenter conditions with said diagonals being extended to their longest length; and wherein at least a portion of one of the said pair of first and second beam members is received in the other of said pair when the mast is folded and said pair of beam members is folded on one another.

2. The extendable mast according to claim 1, wherein each of the pair of said beam members which form the longeron has a H-shaped section which includes a web and flanges formed integral to both sides of the web, said web being tilted relative to a centerline of the flanges, and when this pair of beam members are swung and folded, the flanges of the first beam member are received between the flanges of the second beam member.

3. The extendable mast according to claim 1, wherein the first beam member of said longeron is an elongated one while the second beam member thereof consists of two elongated member arranged parallel to each other with a certain space between them, and the first beam member is received between the two elongated members of said second beam member when the mast is folded.

4. The extendable mast according to claim 1, wherein locking means is provided for the swingable connection between the first and second beam members, said locking means being for locking the first and second beam members in an overcentered condition when the first and second beam members are extended substantially linearly in the overcentered condition.

* * * * *